M. D. Whipple.
Cloth Shearing Mach.

No. 18,796.    Patented Dec. 1, 1857.

N. PETERS, PHOTO-LITHOGRAPHER, WASHINGTON, D. C.

UNITED STATES PATENT OFFICE.

MILTON D. WHIPPLE, OF CHARLESTOWN, MASSACHUSETTS, ASSIGNOR TO A. B. ELY, OF BOSTON, MASSACHUSETTS.

MACHINE FOR SHEARING CLOTH.

Specification of Letters Patent No. 18,796, dated December 1, 1857.

*To all whom it may concern:*

Be it known that I, MILTON D. WHIPPLE, of Charlestown, in the county of Middlesex and State of Massachusetts, have invented certain new and useful Improvements in Machines for Shearing Woolen and other Goods, of which the following is a full, clear, and exact description, reference being had to the accompanying drawings, making part of this specification, in which—

Figure 1:
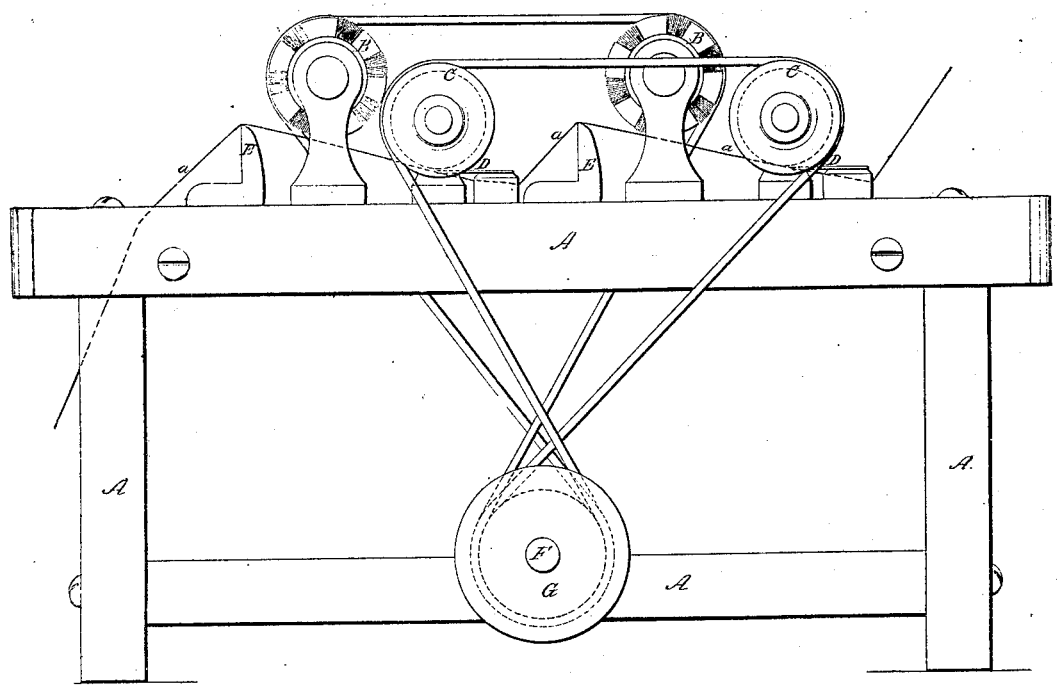
Figure 2:
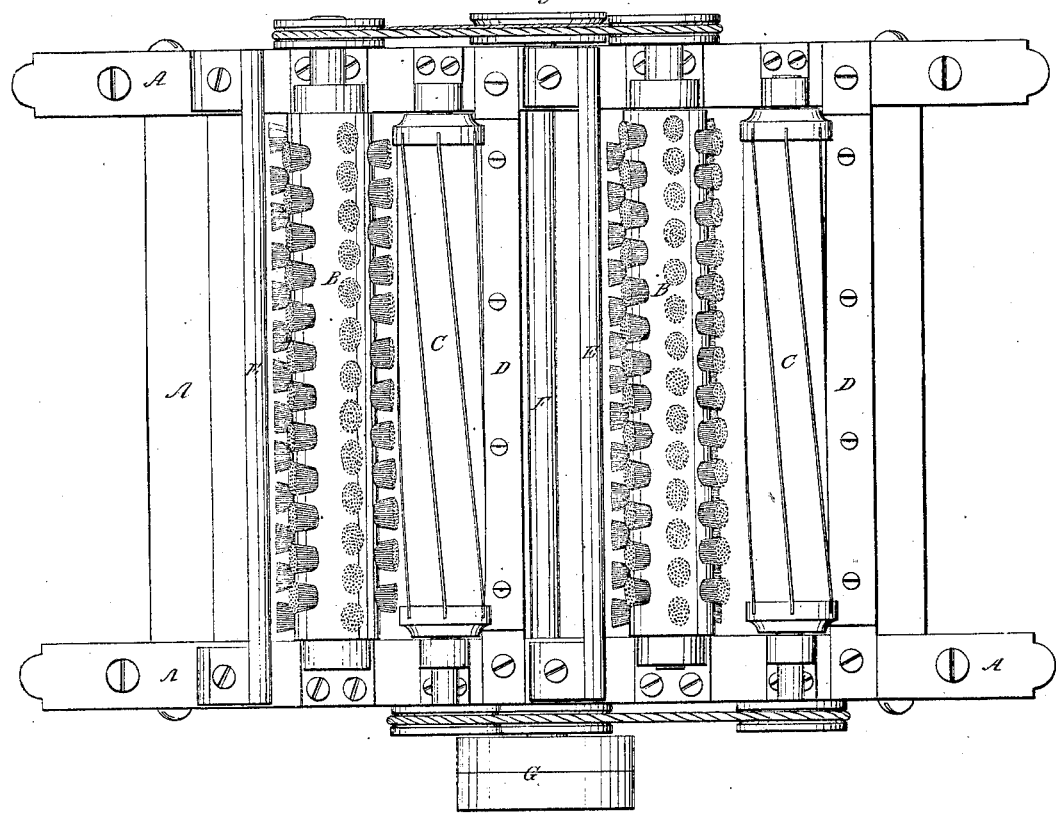

Figure 1 is a side elevation. Fig. 2 is a plan.

In ordinary machines for shearing woolen and other goods, a rest is placed immediately beneath the revolving knife or shearer, over which rest the goods are passed and by which they are held up to the knife. With this arrangement the rest must be set to suit the average thickness of the goods, but should any inequality in thickness occur, caused by a knot or other excrescence on the surface of the goods which is in contact with the rest, the other surface or that being sheared will be liable to be cut by the knife.

To obviate this difficulty is the object of my present invention, which I will proceed to describe, that others skilled in the art may understand and use the same.

In the drawings A, is the frame of the machine in suitable bearings on the top of which run the brush cylinders B and revolving knife cylinders C. These latter are formed of a series of blades placed diagonally on a shaft as shown in the drawings for the purpose of giving to them a draw cut as they revolve in contact with the straight edge of the thin metal ledger blades D.

E are stationary rests supported on the frame of the machine, over which the piece of goods is run as shown by the blue line *a*, in Fig. 1. It is held up by them against the under side of the ledger blades D. There may be one or more sets of brushes, knives, and guards in the same machine. I prefer in practice to use several, to make the work more perfect.

The brush cylinders and knives are driven by bands from pulleys on a shaft F, driven by power applied to its pulley G.

Operation. The piece of goods *a*, Fig. 1, is run through the machine in the direction of the arrow, whence it is led up over a roll in the customary manner, sufficient tension being kept upon it to keep the surface which is being sheared in contact with the under side of the ledger blades D. As the brush cylinders are revolved in the direction of their arrows they raise the fiber or nap of the goods on the surface which is in contact with them ready for it to be seized and cut off by the knives, which is done by the knife cylinders drawing the fibers between the edge of its knives and the edge of the stationary blade D. The thickness of these ledger blades will regulate the length of the nap, or the closeness to which the goods are to be sheared.

It is evident that with a machine thus arranged, the rests being placed away from under the knives, that any knots or irregularities on the back of the goods cannot affect the shearing of the face of them; and as the portion of the surface of the goods which has already passed through the operation of shearing is that which runs in contact with the ledger blades D, it will run smoother and steadier and consequently give the knives a more uniform cut than in any other machine constructed for this purpose with which I am acquainted.

What I claim as my invention and desire to secure by Letters Patent is:

An improvement in machines for shearing goods by removing the rest E away from beneath the shearing knives, and holding the cloth against the ledger blade by tension, in the manner and for the purpose substantially as set forth.

MILTON D. WHIPPLE.

Witnesses:
P. E. TESCHEMACHER,
THOS. R. ROACH.